Patented July 15, 1952

2,603,576

UNITED STATES PATENT OFFICE 2,603,576

WATER REPELLENT TEXTILES AND METHOD OF MAKING SAME

Alton A. Cook, Glen Ridge, Nathaniel C. Shane, Paterson, and Ernest B. Whitworth, Summit, N. J., assignors to Arkansas Company, Inc., Newark, N. J., a corporation of New York No Drawing. Application November 2, 1945, Serial No. 626,448

7 Claims. (Cl. 117—76)

This invention relates to the treatment of textiles and analogous materials such as paper, leather, etc., and the object of the invention is to provide an improved durable water repellent finish. By the term "durable" is indicated a finish which will maintain a definite degree of water repellency after several launderings or dry cleanings. For this purpose, the degree of durability is determined by the Official Spray Test of the American Association of Textile Chemists and Colorists. An evaluation of not less than 70 on the basis of the above method after 3 to 5 launderings is classified as a durable finish. In the range of launderings usually employed, the soap concentration varies from between 0.1% up to 0.5% and these concentrations are usually applied at 100° to 120° F. for 10 to 20 minutes. Such finishes, to be classified as durable, also withstand 3 to 5 dry cleanings with a high flash petroleum solvent such as Stoddard Solvent or Varsol.

In our improved process for forming a durable water repellent finish, there are employed two baths which are used in succession and which contain ingredients which react not only to form the water repellent coating, but also to form a permanent film which is resistant to removal by laundering or dry cleaning, and which acts to retain the water repellent constituents on the fibers.

The first bath contains a wax in emulsion form carried by a long chain fatty acid soap or other suitable emulsifying agent, and may contain a permanent film forming agent such as a resin, cellulose, a cellulose derivative, or a protein, and is usually alkaline. The second bath contains a compound of a tri- or tetra-valent metal, and also an acid such as formic, acetic, phosphoric, etc. The second bath may also, in some cases, contain a permanent film forming agent. The ingredient or ingredients for forming the permanent water insoluble film in the presence of the water repellent finish may, therefore, be in either the first or second bath of this process or, in some cases, in both baths.

Examples of permanent film forming agents are cellulose, cellulose ethers, proteins, resins and resin precondensates. In the case of cellulose and cellulose derivatives, we have found it satisfactory to employ caustic soda or caustic potash solutions of cellulose and cellulose ethers, zinc chloride solutions of cellulose, calcium thiocyanate solutions of cellulose and any other water soluble or water dispersible forms of cellulose or cellulose ethers capable of being insolubilized under the conditions of the process. If resins are employed, they may be water soluble, such as precondensates of formaldehyde and urea of formaldehyde and melamine, or they may be aqueous emulsions of completely formed resins, such as cumarone-indene, polymerized vinyl chloride, copolymers of vinyl acetate and chloride, acrylates, methacrylates, etc. If proteins are used, they may be casein, zein, alpha-protein from soya beans and various other forms. Such products may be used either in alkali soluble form or in the form of aqueous emulsions.

When any of the above permanent film forming agents are employed in the first bath, the acid which is present in the second bath serves to act as a precipitant or coagulant and de-emulsifier, by means of which combination of reactions the permanent film is produced on the fibers.

The water repellent characteristics of the finish are imparted by a combination of the wax used in emulsion form and the reaction products of the soluble fatty soaps used as the emulsifying agent in the first bath, and the tri-valent or tetra-valent metal compound contained in the second bath to form an insoluble soap. These two reactions resulting in the formation of a permanent film-forming compound and the water repellent constituents appear to occur simultaneously in the second bath and give more satisfactory results than if the two reactions were carried out separately.

The wax constituent of the first bath may be paraffin, ceresin, carnauba, candelilla or any other natural wax or synthetic wax such as octadecanamide or other fatty amides. The emulsifying agents for the waxes are usually soaps, but sulfonated oils, water soluble esters or amines or any other suitable agent may be used. The water soluble soaps are made by combining long chain fatty acids which may be stearic, oleic, palmitic, ricinoleic, etc., with an alkali during the process of manufacture of the emulsion. The alkalies used are preferably amines such as triethanolamine and diethanolamine and ammonia, although inorganic alkalies such as caustic potash and caustic soda may be used in some cases. The water soluble fatty acid soap is one of the reactants which aids in forming the water repellent finish as outlined above. The other reactant is the trivalent or tetra-valent metallic compound present in the second bath which forms the water insoluble soap having marked water repellent characteristics. Among the metallic compounds of the character which may be used are aluminum acetate, basic aluminum acetate, basic aluminum formate and zirconium acetate. The insoluble soaps are formed from these compounds in the presence of the emulsified wax or waxes which become de-emulsified simultaneously with the formation of these water insoluble soaps, and the two together impart the desired water repellent finish. The fatty acids in the form of the water soluble soaps, therefore, have two functions—first, they act as emulsifying agents for the wax and resin, and, second, they react to form a water repellent compound in the second bath of our process.

In some cases complete drying between the first and second bath is necessary for optimum results. In other cases, only a heavy squeeze between the baths will produce reasonably satisfactory results. The material after leaving the second bath may in many cases be subjected to an ordinary drying operation (100° to 120° C.), while in other cases, special drying equipment and high temperatures in the range of 120° to 150° C. may be necessary.

The following are examples of baths which may be employed in carrying out our improved process for producing a durable water repellent finish on textile fabrics. It will be understood that the physical character of the finish desired and the type of equipment used will depend upon the particular nature of the baths employed.

*Example #1.*—A spun rayon fabric is first processed with a bath consisting of 5% to 20% of a composition containing 20% of ceresin wax, 10% of stearic acid and 5% of triethanolamine in water. After partial, or preferably complete drying, the fabric is treated with a second bath containing 5% to 20% of a water soluble melamine-formaldehyde precondensate, 2% to 10% of aluminum acetate, and 1% to 5% acetic acid. The fabric is then dried at 120° to 150° C. In this example the triethanolamine reacts with the stearic acid to form triethanolamine stearate, which acts as an emulsifying agent for the ceresin wax. In the second bath, the aluminum acetate reacts with the triethanolamine stearate and forms aluminum stearate in the presence of the wax which is de-emulsified simultaneously, and the final drying of the fabric renders the melamine-formaldehyde precondensate insoluble. This resultant insoluble resin, formed in the presence of the aluminum stearate and the wax, produces a permanent film, and this retains and renders durable the wax and insoluble aluminum soap which imparts the water repellent characteristics to the fabric.

*Example #2.*—A cellulosic fabric is first treated with a bath consisting of 5% to 20% of a composition containing 20% paraffin wax, 10% oleic acid, and 5% triethanolamine in water, and 20% to 50% of a caustic soda solution of ethyl cellulose containing 6% of the latter. After partial, or preferably complete drying, the fabric is treated with a bath containing 5% to 10% basic aluminum formate and 2% to 10% formic acid. After drying at 100° to 120° C., a durable water repellent finish is produced. In this case, the permanent film forming material is ethyl cellulose, and is employed in the first bath. The formic acid in the second bath acts to neutralize the excess caustic soda and precipitate the cellulose ether at the same time that the aluminum formate reacts with the triethanolamine oleate and de-emulsifies the wax emulsion to give the water repellent characteristics.

*Example #3.*—A cellulosic fabric is treated with a bath consisting of a caustic soda solution containing 2% to 6% of cellulose together with 5% to 20% of an emulsion containing 10% paraffin wax, 10% candelilla wax and 5% sodium stearate. After partial or preferably complete drying, the fabric is treated with a bath containing 5% to 10% of aluminum acetate and 1% to 5% of sulfuric acid. The reactions involved in this case are very similar to those described in Example #2 above. After passing through the second bath in this case, it is desirable to rinse the cloth in a dilute ammonia solution in order to neutralize any free acid. It is then dried at a temperature of 100° to 120° C. to produce a durable water repellent finish.

*Example #4.*—A mixed rayon and cotton fabric is treated in two separate and successive baths with intermediate drying. The first bath contains 5% to 20% of an emulsion consisting of 10% ozokerite, 10% paraffin wax, 10% palmitic acid and 4% diethanolamine. The second bath contains 5% to 25% of a urea precondensate such as dimethylol urea, 2% to 10% of zirconium acetate, and 1% to 5% of formic acid. The reactions occurring in this example are practically identical with those described under Example #1.

*Example #5.*—A fabric composed of spun rayon and wool is treated as described above, but in the first bath in this case contains 1% to 10% of a water soluble hydroxy ethyl cellulose, 2% to 15% of a water soluble urea-formaldehyde precondensate, and also 5% to 20% of a compound containing 20% paraffin wax, 15% stearic acid and 5% concentrated ammonium hydroxide. The second bath contains 2% to 5% zirconium acetate and 1% to 3% tetraphosphoric acid. The reactions taking place in the above examples are very similar to those of the preceding examples, except that in this case the combination of the hydroxy cellulosic ether and urea resin appears to give superior results to examples in which the hydroxy ethyl cellulose and the urea formaldehyde precondensate are used separately as the permanent film forming agent. In this case also, a drying temperature of 120° to 150° C. will suffice to produce a durable water repellent finish.

*Example #6.*—A fabric is treated as above described, the first bath containing 5% to 20% of an emulsion consisting of 50% of polymerized vinyl chloride and 5% to 20% of an emulsion containing 15% paraffin wax, 5% octadecanamide, 10% stearic acid and 5% triethanolamine. The second bath contains 10% basic aluminum formate and 5% formic acid. In the above case, the permanent film forming agent is the polymerized vinyl chloride emulsion which becomes de-emulsified in the second bath and is rendered insoluble. The other reactions in this case are similar to those described in the above examples. In this case, a final drying temperature of 100° to 120° C. is sufficient to yield a durable water repellent finish.

*Example #7.*—A fabric is treated as above described, the first bath containing 5% to 10% of soyabean protein solubilized by caustic potash and 5% to 25% of a compound containing 10% paraffin wax, 5% montan wax, 5% palmitic acid and 2% monoethanolamine. The second bath contains 5% to 10% of a melamine-formaldehyde precondensate, 5% to 10% basic aluminum formate and 2% to 10% formic acid. The formic acid in the second bath acts to precipitate the soya-bean protein and also as a catalyst to polymerize the melamine-formaldehyde precondensate, which together with the soya-bean protein forms the permanent film forming constituent.

In this case, a permanent film forming agent is used both in the first and second baths. The other reaction involving the fatty acid soap and the aluminum compound are similar to what has already been described.

In some of the examples, such for instance as 5, 6 and 7 and possibly 2 and 3, the components of the first bath may be combined as a concentrated product and sold as such, and this need only to be diluted with water to the required concentration for use.

Having thus described our invention what we claim as new and desire to secure by Letters Patent is:

1. A process of treating a textile material which comprises processing it in an aqueous bath containing a wax and a long chain fatty acid soap, drying and then processing it in a second aqueous bath containing a dilute acid and a water soluble polyvalent metal salt, and finally drying, at least one of said baths including a water soluble cellulose derivative and at least one of said baths also containing a water soluble aldehyde resin precondensate.

2. A process of treating a textile material which comprises processing it in an aqueous bath containing a wax and a long chain fatty acid soap, drying and then processing it in a second aqueous bath containing a dilute acid and a water soluble polyvalent metal salt, and finally drying, at least one of said baths including a water soluble ethyl cellulose derivative and at least one of said baths also containing a water soluble urea formaldehyde resin precondensate.

3. A process of treating a textile material which comprises processing it in an aqueous bath containing a wax and a long chain fatty acid soap, drying and then processing it in a second aqueous bath containing a dilute acid and a water soluble polyvalent metal salt, and finally drying, the first bath containing a water soluble cellulose derivative and the first bath also containing a water soluble aldehyde resin precondensate.

4. A process of treating a textile fabric which comprises treating it with an aqueous bath containing 1% to 10% of a water soluble hydroxy ethyl cellulose, 2% to 15% of a water soluble urea-formaldehyde precondensate and 5% to 20% of a compound containing 20% paraffin wax, 15% stearic acid and 5% concentrated ammonium hydroxide, then with an aqueous bath containing 2% to 5% zirconium acetate and 1% to 3% tetraphosphoric acid and then drying.

5. A process of treating a textile fabric which comprises treating it with an aqueous bath containing a water soluble hydroxy ethyl cellulose, a water soluble urea-formaldehyde precondensate and a compound containing paraffin wax, stearic acid and concentrated ammonium hydroxide, then with an aqueous bath containing zirconium acetate and tetraphosphoric acid and then drying.

6. A textile material finished with a durable water repellent finish resulting from the process of claim 1.

7. A textile material finished with a durable water repellent finish resulting from the process of claim 5.

ALTON A. COOK.
NATHANIEL C. SHANE.
ERNEST B. WHITWORTH.

REFERENCES CITED

The following references are of record in the file of this patent:

UNITED STATES PATENTS

| Number | Name | Date |
|---|---|---|
| 1,971,274 | Richter | Aug. 21, 1934 |
| 2,069,786 | Meulen | Feb. 9, 1937 |
| 2,191,362 | Widmer | Feb. 20, 1940 |
| 2,270,180 | Bass et al. | Jan. 13, 1942 |
| 2,316,057 | Doser | Apr. 6, 1943 |
| 2,320,644 | Nill | June 1, 1943 |
| 2,344,926 | Thackston et al. | Mar. 21, 1944 |
| 2,361,830 | Edelstein | Oct. 31, 1944 |